(12) United States Patent
   Redgate

(10) Patent No.: US 11,240,315 B2
(45) Date of Patent: *Feb. 1, 2022

(54) SYSTEMS AND METHODS FOR REMOTE MANAGEMENT OF APPLIANCES

(71) Applicant: Carbonite, Inc., Boston, MA (US)

(72) Inventor: Karl Redgate, Concord, MA (US)

(73) Assignee: CARBONITE, INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/205,906

(22) Filed: Mar. 18, 2021

(65) Prior Publication Data

US 2021/0211503 A1 Jul. 8, 2021

Related U.S. Application Data

(63) Continuation of application No. 16/263,112, filed on Jan. 31, 2019, now Pat. No. 10,986,186, which is a continuation of application No. 14/980,757, filed on Dec. 28, 2015, now Pat. No. 10,257,280.

(51) Int. Cl.
   *H04L 29/08* (2006.01)
   *H04L 29/06* (2006.01)
(52) U.S. Cl.
   CPC ........ *H04L 67/125* (2013.01); *H04L 63/0272* (2013.01); *H04L 63/061* (2013.01); *H04L 63/08* (2013.01)
(58) Field of Classification Search
   CPC ..... H04L 67/125; H04L 63/08; H04L 63/061; H04L 63/0272
   See application file for complete search history.

(56) References Cited

U.S. PATENT DOCUMENTS

| 6,680,730 B1 | 1/2004 | Shields et al. |
| 6,874,088 B1 | 3/2005 | Stevens |
| 8,892,735 B2 * | 11/2014 | Garrett .................... H04L 67/14 709/225 |
| 9,542,172 B2 | 1/2017 | Alsina |
| 9,851,980 B1 * | 12/2017 | Li ............................. G06F 9/44 |
| 10,257,280 B2 | 4/2019 | Redgate |

(Continued)

OTHER PUBLICATIONS

Office Action for U.S. Appl. No. 14/980,757, dated May 31, 2018, 18 pgs.

(Continued)

*Primary Examiner* — Javier O Guzman
(74) *Attorney, Agent, or Firm* — Sprinkle IP Law Group

(57) ABSTRACT

The present disclosure describes systems and methods for remote management of appliances. The appliance may be configured to periodically check in a predetermined online location for the presence of a trigger file identifying one or more appliances directed to contact a management server for maintenance. If the file is present at the predetermined location and the file includes the identifier of the appliance, the appliance may initiate a connection to the management server. If the file is not found, then the appliance may reset a call timer and attempt to retrieve the file at a later time. To avoid having to configure addresses on the appliance, link local IPv6 addresses may be configured for use over a virtual private network, allowing administration, regardless of the network configuration or local IP address of the appliance.

16 Claims, 6 Drawing Sheets

(56) References Cited

U.S. PATENT DOCUMENTS

| 10,986,186 B2 | 4/2021 | Redgate |
| 2001/0048686 A1 | 12/2001 | Takeda |
| 2003/0110263 A1 | 6/2003 | Shillo |
| 2005/0025157 A1 | 2/2005 | Pennec |
| 2005/0028165 A1 | 2/2005 | McGowan |
| 2005/0185647 A1 | 8/2005 | Rao |
| 2006/0031828 A1 | 2/2006 | Won |
| 2006/0236378 A1 | 10/2006 | Burshan |
| 2011/0040829 A1 | 2/2011 | Lee |
| 2013/0268124 A1 | 10/2013 | Matsuoka et al. |
| 2019/0166204 A1 | 5/2019 | Redgate |
| 2021/0211502 A1 | 7/2021 | Redgate |

OTHER PUBLICATIONS

Office Action for U.S. Appl. No. 16/263,112, dated Jul. 31, 2019, 19 pgs.
Office Action for U.S. Appl. No. 16/263,112, dated Nov. 22, 2019, 21 pgs.
Office Action for U.S. Appl. No. 16/263,112, dated Feb. 27, 2020, 28 pgs.
Office Action for U.S. Appl. No. 16/263,112), dated Sep. 2, 2020, 28 pgs.
Notice of Allowance for U.S. Appl. No. 16/263,112, dated Dec. 16, 2020, 9 pgs.
Notice of Allowance issued for U.S. Appl. No. 17/205,900, dated Sep. 21, 2021, 14 pages.

\* cited by examiner

SYSTEMS AND METHODS FOR REMOTE MANAGEMENT OF APPLIANCES

RELATED APPLICATION(S)

The present application is a continuation of, and claims a benefit of priority under 35 U.S.C. 120 of U.S. patent application Ser. No. 16/263,112 filed Jan. 31, 2019, entitled "SYSTEMS AND METHODS FOR REMOTE MANAGEMENT OF APPLIANCES," issued as U.S. Pat. No. 10,986,186, which is a continuation of, and claims a benefit of priority under 35 U.S.C. 120 of U.S. patent application Ser. No. 14/980,757 filed Dec. 28, 2015, entitled "SYSTEMS AND METHODS FOR REMOTE MANAGEMENT OF APPLIANCES," issued as U.S. Pat. No. 10,257,280, which are hereby incorporated herein for all purposes.

FIELD

The present application relates to systems and methods for management, configuration, and upgrading of appliances and other devices via a network.

BACKGROUND

Providing management and support for remote devices and appliances typically requires some method of remote login or connection to the device or appliance. For example, an appliance may execute a remote desktop server, a secure shell (SSH) server, or similar server and may wait for an administrator or technician to connect and authenticate to perform maintenance tasks. Not only does this require constant use of resources on the appliance, the open server represents a potential security risk as it accepts incoming connections prior to authentication. Even if the appliance is secured by strong passwords or other authentication systems, the open server is vulnerable to denial of service attacks.

Furthermore, in order to connect to the appliance, the administrator needs to be able to find the appliance on the network. This requires either that the appliance be configured to broadcast its availability, again creating a security risk, or that the appliance be preconfigured with a static internet protocol (IP) address, reachable by the administrator. This may severely limit deployment scenarios, such as behind network address translators or gateways or where multiple appliances share a common public IP address. At best, these implementations require additional time and documentation during installation to record the appliance IP address, precluding easy re-deployment or plug-and-play solutions.

SUMMARY

The present disclosure describes systems and methods for remote management of appliances or other computing devices, referred to generally as "devices", including backup appliances, network devices, or any other such computing device. Management functions may include retrieval of logs, performing configuration or software updates, health monitoring, or any other type and form of management function. Rather than executing servers or requiring pre-configuration of IP addresses on the device, the device may be configured to periodically check for the presence of a trigger or "call home" file in a predetermined online location, such as a webpage identified at a specified uniform resource locator (URL). The trigger file may comprise an identifier of one or more appliances directed to contact a management server for maintenance. If the file is present at the predetermined location and the file includes the identifier of the appliance, it may initiate a connection to the management server. In some implementations, the appliance may generate a certificate signing request and get a signed response from the management system, and use that cryptographic key to connect via a virtual private network (VPN) to the management server. To avoid having to configure addresses on the appliance, link local IPv6 addresses may be used over the VPN. An administrator connected to the management server may then have remote access to the appliance, regardless of the network configuration or local IP address of the appliance. Conversely, if the file is not found, then the appliance may reset a call timer and attempt to retrieve the file at a later time. The timer may be of any value, depending on responsiveness requirements.

In one aspect, the present disclosure is directed to a method for remote management of a device. The method includes periodically requesting, by a device from a server accessible via a network, a file at a predetermined storage location. The method also includes receiving the file, by the device from the server, the file transmitted responsive to the request. The method further includes determining, by the device, that a remote management session is requested responsive to receiving the file. The method also includes initiating, by the device responsive to the determination, a connection via a virtual private network to a management server.

In some implementations, the method includes transmitting a first request, by the device to the server, for the file at the predetermined storage location; and receiving, by the device from the server, an identification that the file is not available. In a further implementation, the method includes resetting a request timer, by the device, responsive to receiving the identification that the file is not available. In a still further implementation, the method includes transmitting a second request, by the device to the server, for the file at the predetermined storage location, responsive to expiration of the request timer; and the file is transmitted to the device from the server responsive to the transmitted second request.

In another implementation, the method includes transmitting a first request, by the device to the server, for the file at the predetermined storage location. The method also includes receiving, by the device from the server, the file, responsive to the first request; and determining, by the device, that the file does not include an identifier of the device. The method further includes resetting a request timer, by the device, responsive to the determination that the file does not include the identifier of the device. In a further implementation, the method includes transmitting a second request, by the device to the server, for the file at the predetermined storage location, responsive to expiration of the request timer. The method also includes receiving the file, by the device from the server, responsive to the second request; and determining, by the device, that the file received responsive to the second request includes the identifier of the device.

In some implementations, the method includes determining that the file comprises an identifier of the device. In other implementations, the method includes determining that a remote management session is requested is based on the presence of the file at the predetermined storage location. In still other implementations, initiating the connection via the virtual private network to the management server further includes requesting a cryptographic key from the server; and using the cryptographic key to encrypt communications with the management server. In yet other implementations, the method includes configuring an IPv6 link local address for the connection.

In another aspect, the present disclosure is directed to a remotely managed device, including a network interface and a processor executing a management agent. The management agent is configured to periodically request, a server via the network interface, a file at a predetermined storage location; determine that a remote management session is requested responsive to receiving the requested file; and initiate a connection via a virtual private network to a management server, via the network interface, responsive to the determination.

In some implementations, the device includes a request timer. The management agent is further configured to transmit a first request to the server for the file at the predetermined storage location; receive, from the server, an identification that the file is not available; and reset the request timer responsive to receiving the identification that the file is not available. In a further implementation, the management agent is further configured to transmit a second request for the file at the predetermined storage location, responsive to expiration of the request timer; and the file is transmitted from the server responsive to the second request.

In another implementation, the device includes a request timer, and the management agent is further configured to transmit a first request to the server for the file at the predetermined storage location; and receive the file from the server, responsive to the first request. The management agent is also configured to determine that the file does not include an identifier of the device; reset the request timer, responsive to the determination that the file does not include the identifier of the device; and transmit a second request to the server for the file at the predetermined storage location, responsive to expiration of the request timer. The management agent is further configured to receive the file from the server, responsive to the second request; and determine that the file received responsive to the second request includes the identifier of the device.

In some implementations, the management agent is further configured to determine that the file comprises an identifier of the device. In other implementations, the management agent is further configured to determine that a remote management session is requested is based on the presence of the file at the predetermined storage location. In still other implementations, the management agent is further configured to request a cryptographic key from the server, and use the cryptographic key to encrypt communications with the management server. In yet other implementations, the management agent is further configured to configure an IPv6 link local address for the connection.

In another aspect, the present disclosure is directed to a method for remote management of a device. The method includes selecting, by a user of a management server, a device for remote management from a plurality of devices. The method also includes generating, by the management server, a trigger file comprising an identification of the selected device. The method further includes transferring, by the management server, the trigger file to a web server, the plurality of devices periodically requesting the trigger file from the web server. The method also includes receiving, by the management server from the selected device, a request to establish a management session, the request triggered by retrieval of the trigger file by the selected device from the web server; and initiating, by the management server, a connection via a virtual private network to the selected device. In some implementations, the method includes configuring a link-local address for communication with the selected device via the virtual private network.

BRIEF DESCRIPTION OF THE FIGURES

In the drawings, like reference numbers generally indicate identical, functionally similar, and/or structurally similar elements.

DETAILED DESCRIPTION

The following description in conjunction with the above-reference drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

A device may be configured to periodically check for the presence of a trigger file in a predetermined online location, such as a webpage, file transfer protocol (FTP) site, cloud storage location, or other such storage. If the device does not find a trigger file, or in some implementations, if the device finds a trigger file that does not include an identifier of the device, then the device may reset a timer and check again. If the file is present at the predetermined location and, in some implementations, if the file includes the identifier of the device, the device may initiate a connection to a management server. In one implementation, the appliance may establish a VPN connection with the management server and/or a management device or console. To avoid requiring network address configuration, the appliance and management device or server may use IPv6 link local addresses to communicate, further reducing manual effort required for management.

Figure 1:
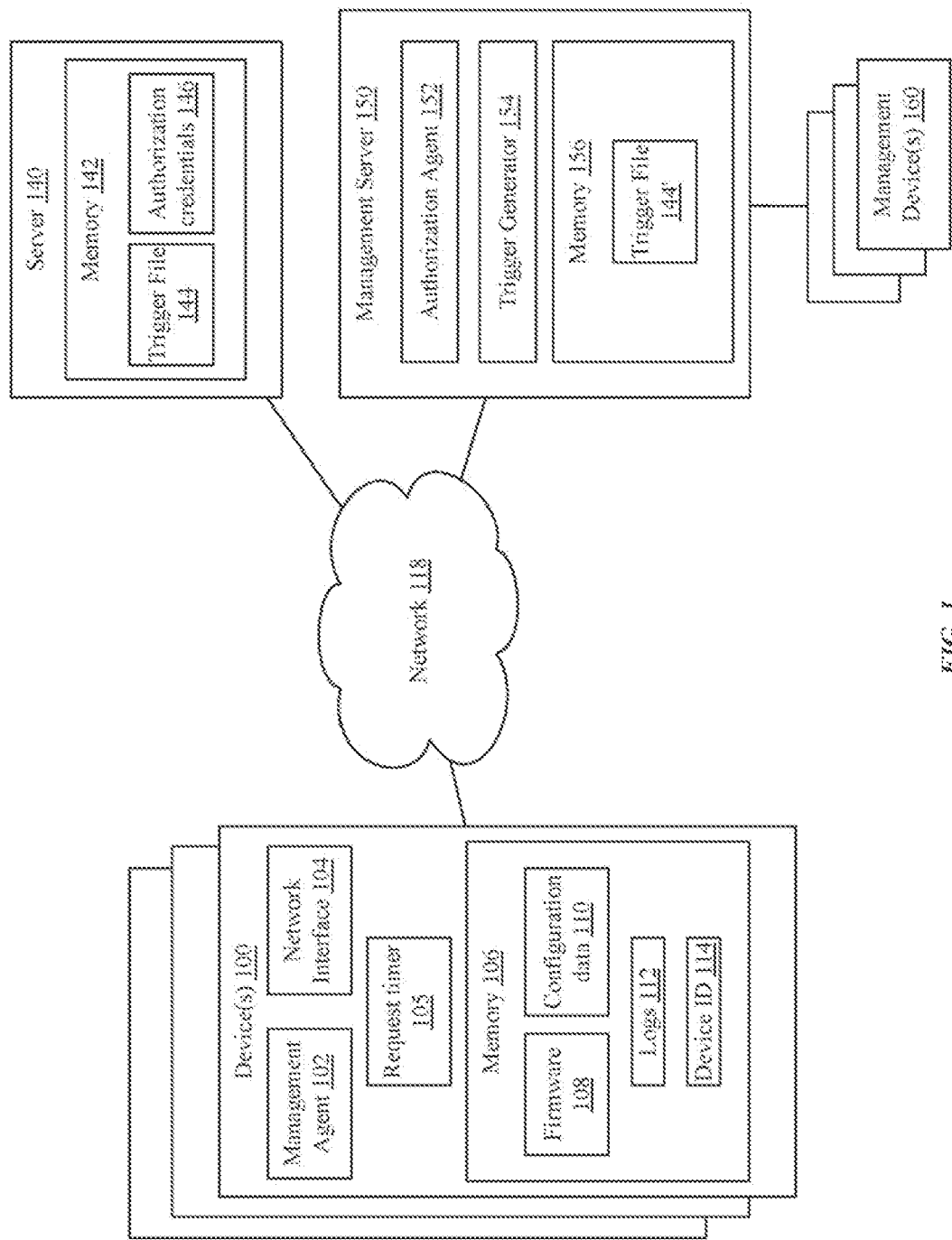
FIG. 1 is a diagram of an implementation of a system for remote administration of a device.

Referring first to FIG. 1, illustrated is a diagram of an implementation of a system for remote administration of a device. As shown, one or more devices 100 may communicate via a network 118 with a server 140 and/or management server 150. A device 100 may be a local backup server, a network device or accelerator, a file or application server, a media server, a load balancer, a gateway, a firewall, or any other type or form of device or appliance. In some implementations, device 100 may have no user-configurable network features. For example, device 100 may be a smart appliance, such as a dishwasher or other appliance with the ability to provide maintenance logs to or receive software updates from a remote administrator.

Multiple devices 100 may be on the same network, such as multiple backup servers or other devices deployed on a single local area network (LAN). In other implementations, devices 100 may be on different networks, or different portions of a network.

A device 100 may include a management agent 102. Management agent 102, sometimes referred to as an agent or client agent, may comprise an application, server, service, daemon, routine, or other executable logic for periodically requesting a trigger file, analyzing the file if available, and connecting to a management server and/or device responsive to the presence of the trigger file. Management agent 102 may include functions for remote retrieval of a web page or file from a predetermined location, and may control a network interface 104 to communicate with a web or file server via a network 118 to request the page or file. Management agent 102 may maintain a timer and reset the timer, responsive to the absence of the trigger file at the predetermined location or responsive to an absence of an identification of the device within the trigger file. The timer may be used to cause the agent to periodically request the file, as discussed above.

Network interface 104 may comprise a wired interface, such as an Ethernet interface, universal serial bus (USB) interface, a power line interface, a serial interface, or any other type and form of wired interface. In other implementations, network interface 104 may comprise a wireless interface, such as a WiFi or 802.11 interface, a cellular interface, a Bluetooth interface, a wireless USB interface, or any other type and form of wireless interface. In some implementations, a network interface 104 may include both a wired and wireless interface, to provide additional flexibility, reliability, or bandwidth. Network interface 104 may include one or more layers of a network stack, including transport layer functions, Internet layer functions, physical layer functions and interfaces, or any other such functions or interfaces. Network interface 104 may communicate via a network 118 and/or one or more other networks, including a LAN behind a gateway or NAT or other such device. Accordingly, the network interface 104 may have an IP address that is available to a wide area network (WAN, such as the Internet) or may be behind an appliance and have an IP address directly available only to the local network. In some implementations, as discussed in more detail below, network interface 104 may configure an IPv6 link-local address to communicate with a management server or device, avoiding address conflicts without requiring particular configuration. The link-local address may be based on a media access control (MAC) address of the network interface, as described in IETF RFC 4291, or may be based on any other device-specific identifier.

In some implementations, device 100 may maintain a request timer 105. Timer 105 may be a countdown or count-up timer or any similar sort of timer for directing the management agent 102 to periodically initiate a request for a trigger file. Timer 105 may be part of a management agent 102, or may be a data structure or variable stored in memory 106.

Memory 106 may be any type and form of storage device, including Flash memory, RAM, EPROM, a hard drive, or any other such device, discussed in more detail below in connection with FIG. 5. Memory 106 may store one or more executable programs, including a management agent 102, as well as operating systems, executable firmware 108, device drivers, or other data. Memory 106 may also store configuration parameters or data 110, and log or device health monitoring data 112. In some implementations, memory 106 may be internal to a device 100, while in other implementations, memory 106 may be external or a combination of internal and external memory.

Device 100 may include a unique identifier or device identifier 114. In some implementations, the device identifier 114 may be a MAC address, while in other implementations, the device identifier 114 may be a serial number, model and serial number, or any other such information to uniquely identify the device. As shown, in some implementations, the device identifier 114 may be stored in memory 106. In other implementations, such as where the device identifier 114 is a MAC address, the device identifier may be stored by the network interface 104 or within memory of the interface.

Device 100 may communicate via a network 118, which may be a LAN, WAN such as the Internet, or a combination of one or more networks, including cellular networks, satellite networks, terrestrial networks, optical networks, wireless networks, or any other type and form of network. In some implementations, device 100 may be connected to a LAN behind a gateway or NAT connected to the Internet, and may not have a WAN-access IP address.

Server 140 may be a file server, web server, or similar online storage location executed or maintained by one or more computing devices, and may include memory 142, similar to memory 106. Server 140 may also include one or more network interfaces (not illustrated), similar to network interface 104. Server 140 may be a cloud of servers, a virtual machine or virtual cloud executed by a physical machine or set of physical machines, or other such device or devices. In many implementations, server 140 may be a web server providing, when directed, a trigger file 144 at a predetermined URL. As discussed above, device(s) 100 may periodically connect and request the file at the predetermined URL. If the file is not present (for example, if no administrator has initiated a remote administration session), then the server 140 may reply with a standard 404 "file not found" HTTP error. If the file is present, a device 100 may retrieve the file and determine whether its device identifier 114 is included in the file. If not, the device 100 may return to normal operations. If so, the device may initiate a management session with management server 150, as discussed in more detail below. In other implementations, other file transfer protocols may be used to serve the file, including FTP or secure FTP (SFTP), or even mail protocols such as IMAP or POP. In other implementations, a management trigger or device identifier may be provided to the device via other means. For example, in one such implementation, a device may transmit a request to the server 140 and the server may reply with a response packet including one or more device identifiers in a body of the packet.

Server 140 may also maintain authorization credentials 146, which may be a cryptographic key, certificate, signature, or similar data. After determining that a management trigger in a trigger file identifies the device, in some implementations, the device may transmit a certificate signing request or similar request for authorization credentials 146 from server 140. The credentials or certificate may then be provided by the device 100 to a management server 150 when establishing a VPN connection, confirming the identity of the device.

Management server 150 may be one or more computing devices, such as a cloud or cluster of devices, for establishing a VPN connection between a device and the management server 150 or a management device 160, and may include a memory 156, similar to memory 106. In some implementations, management server 150 may be a virtual machine executed by another computing device. In many implementations, management server 150 and server 140 may be the same device. Management server 150 may also include one or more network interfaces (not illustrated), similar to network interface 104. In some implementations, management server 150 may be a computing device of an administrator; in such implementations, management device(s) 160 may not be utilized, or their features may be combined with those of management server 150. Management server 150 may serve as a management interface for administrators to device(s) 100, as well as server 140. An administrator may direct an trigger generator 154 executed by management server 150 to create a trigger file 144' to command a specified device 100 to establish a connection for remote management. The server 150 may upload or transfer the trigger file 144' to memory 142 of server 140. As discussed above, the device 100 may subsequently retrieve the trigger file 144 and, responsive to detecting its device identifier 114 within the file, may establish a VPN session with the management server 150.

Authorization agent 152 may be an application, server, service, daemon, or other executable logic for establishing a VPN session with a device 100 over network 118, and/or for establishing an end-to-end VPN session between a management device 160 and device 100. Authorization agent 152 may maintain a cryptographic key, signature, or other authorization credentials, such as credentials 146. In some implementations, authorization agent 152 may provide a cryptographic certificate to server 140 which may be used to respond to certificate signing requests from devices 100, as discussed above. Accordingly, when receiving a request to establish a VPN session, the authorization agent 152 may ensure that the requesting device has received the certificate from server 140. Once a session is authorized, management server 150 may configure an IPv6 link-local address for communication via the VPN with a device 100, or may provide data forwarding over the VPN to and from a separate management device or console 160.

Trigger generator 154 may be an application, server, service, daemon, or other executable logic for generating a trigger file 144, 144', responsive to receiving a request from an administrator to manage a device 100. In some implementations, trigger generator 154 may provide a user interface, such as a graphical or command line interface, for selecting a device 100 from a list or set of devices 100, or for entering a device identifier. Upon generating the trigger file 144', the trigger generator 154 may upload or transfer the file to server 140 for serving to device(s) 100. In some implementations, trigger generator 154 may generate an expiration date or time for a trigger file or maintain an expiration counter for a trigger file. Upon expiration, or responsive to an device 100 successfully establishing a management session with management server 150 or a management device 160, the trigger generator 154 may remove the file from server 140 or transmit a command to delete the file from memory of the server. In other implementations, the trigger generator may replace the file with a null file or a trigger file including no device identifiers.

Management device(s) 160 may be any type and form of computing devices, such as a laptop computer, desktop computer, tablet computer, wearable computer, smart phone, or other such device. Management device 160 may be a physical device, or may be a virtual machine executed by another device. Management device 160 may include memory, similar to memory 106, storing firmware 108 or configuration data 110 for transfer to a device 100, or for storing retrieved log files 112. Management device 160 may also include a network interface, similar to network interface 104, for communicating with a device 100 via network 118.

Management device 160 may also include a device identifier 114, such as a MAC address. As discussed above, a management device 160 may configure an IPv6 link-local address for communications with a device 100 via an established VPN connection, avoiding address conflicts. In some implementations, a management device 160 may be a thin client or terminal with functionality provided by management server 150. In other implementations, the management server may be a management device.

Figure 2:
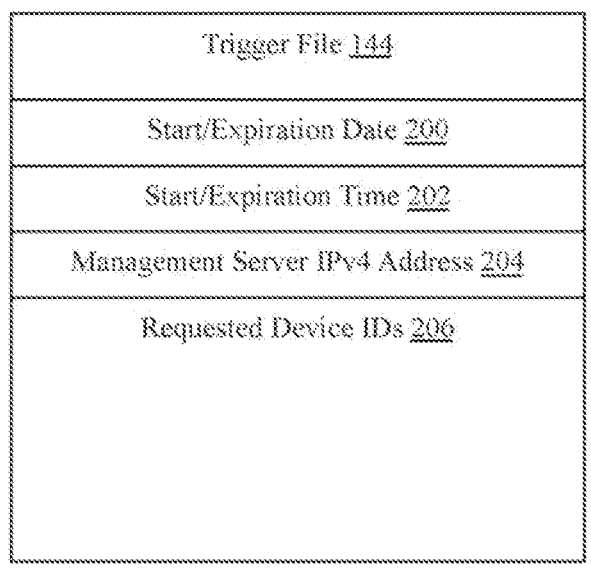
FIG. 2 is a diagram of an implementation of a trigger file.

FIG. 2 is a diagram of an implementation of a trigger file 144. The trigger file 144 may be any type and form of data file, including a flat file, extensible markup language (XML) or hypertext markup language (HTML) file, database, array, or other such data format. The file may include, in some implementations, a start and/or expiration date 200 and/or a start and/or expiration time 202. Expiration dates or times may be used in some implementations to delete or suspend serving the trigger file in instances where an appliance or device has not contacted the management server. In other implementations, the file may not expire, but may be removed only when the appliance or device successfully contacts the management server. In some implementations, the trigger file 144 may include an address 204 of the management server. The device 100 may use the address 204 to establish a VPN connection with the management server and/or a management device. In other implementations, the address of the management server may be preconfigured on the appliance or device, and the trigger file may not include the address. The trigger file 144 may further include one or more device identifiers 206 of devices that an administrator wishes to connect to a remote management session. In some implementations, the device identifiers 206 may be encoded or obfuscated. The device identifiers may be partial identifiers, or may be encrypted or hashed with a predetermined key available to the corresponding device.

Figure 3:
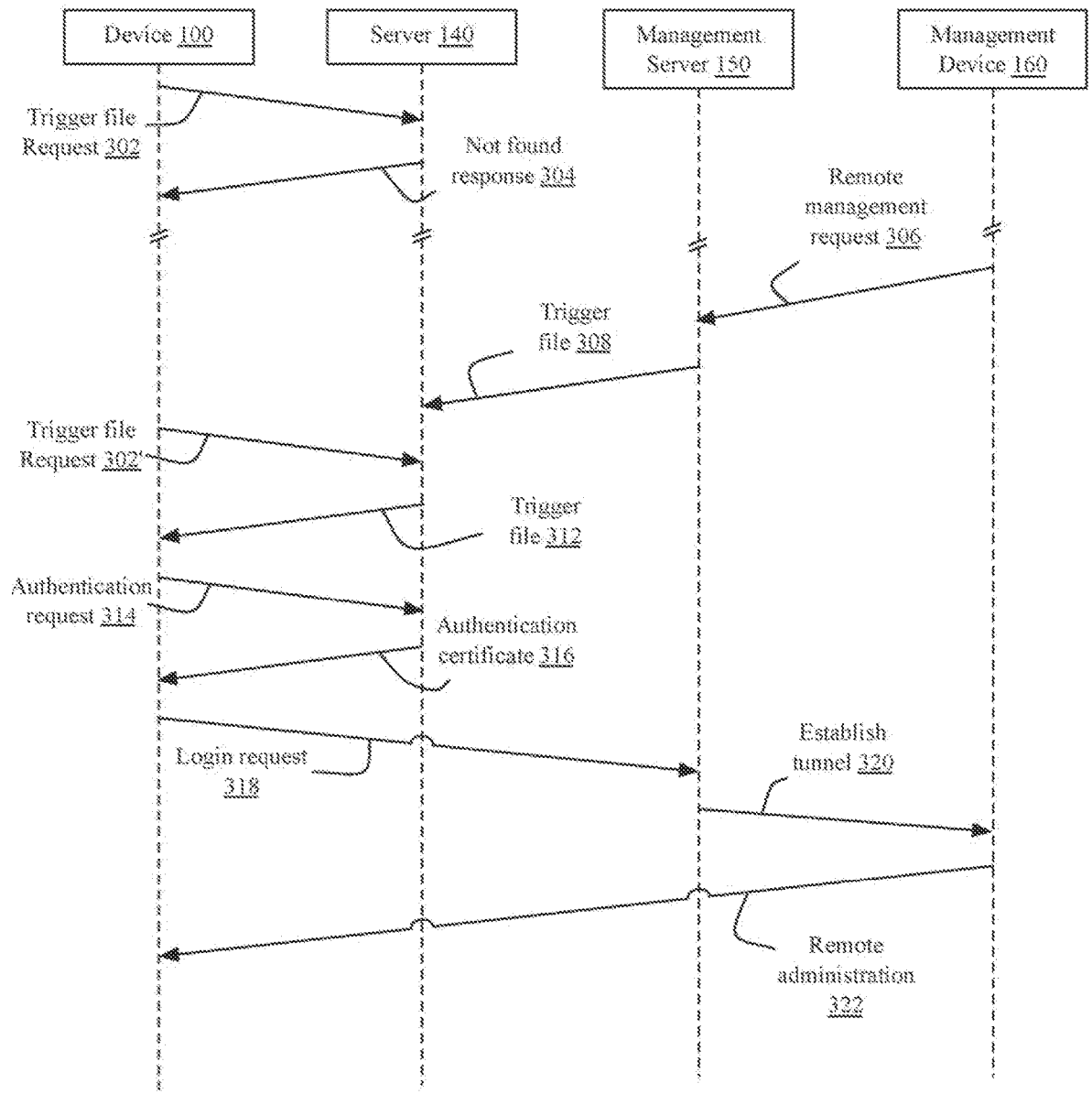
FIG. 3 is a signal flow diagram of a method for remote administration of a device, according to one implementation.

FIG. 3 is a signal flow diagram of a method for remote administration of a device, according to one implementation. As shown, a device 100 may transmit a request 302 for a trigger file to a server 140. In some implementations, the server 140 may respond with a "not found" response 404 error. In other implementations, as discussed above, the server 140 may respond with a null or empty trigger file or file that does not include the device identifier of the device 100. Steps 302-304 may be repeated periodically.

At some time, an administrator may direct a management device 160 to transmit a remote management request 306 to management server 150. The management server 150 may generate a trigger file and transmit the trigger file 308 to server 140. In other implementations, management device 160 and management server 150 may be the same device, and request 306 may be omitted or may be internal to the server.

At a subsequent time, device 100 may again transmit a request 302' for the trigger file to server 140. The server may reply with trigger file 312. In other implementations, the server may respond with a response including device identifiers, such as in a payload of a packet, as discussed above. If the trigger file includes a device identifier of device 100, then in some implementations, the device may transmit an authentication request 314 to server 140. The authentication request 314 may include a certificate signing request, request for a cryptographic key, request for an authorization token or cookie, or any other such authentication. In some implementations, the authentication request 314 may include one or more authentication credentials, such as a device identifier of the device, a cryptographic key or signature of the device, a certificate of the device, or other such credential. The server 140 may reply with a corresponding authentication certificate 316, key, token, cookie, or similar response, as appropriate.

Device 100 may then transmit a login request 318 to management server 150. Login request 318 may be a request to initiate a VPN session or tunnel with or via management server 150, a request to login or authenticate for remote management or other such request. The login request may include a signature, credential, certificate, token, or cookie obtained from server 140 in response 316. Although illustrated as a single request, in some implementations, login request 318 may comprise a plurality of requests and/or responses, including handshaking procedures, login and/or authentication, administration requests or identification of a management device 160, or any other such steps. Upon authenticating the device, the management server 150 may establish a VPN tunnel 320 between device 100 and the management server 150 and/or management device 160.

Establishing the tunnel may include performing one or more handshaking routines, initiating further connections, or performing address translation or forwarding. Once the tunnel has been established, the device 100 and management device 160 or management server 150 may configure IPv6 link-local addresses, perform IPv6 neighbor discovery or other discovery routines, and perform management and administration functions via the tunnel, using the IPv6 link-local addresses as source and destination addresses. Management functions may include retrieving log files, uploading firmware or driver updates, changing configuration options, or any other such tasks.

Figure 4A:
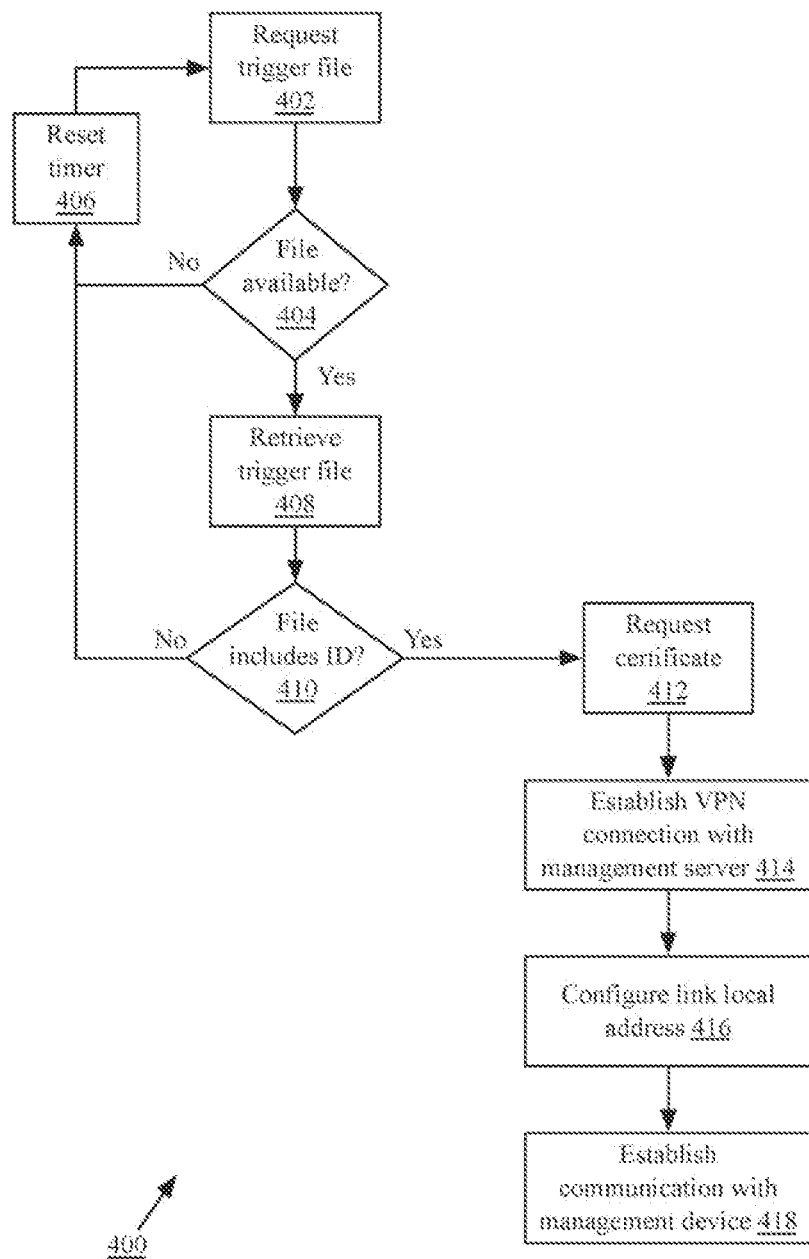
FIGS. 4A and 4B are flow charts of implementations of a method for remote administration.

FIG. 4A is a flow chart of an implementation of a method 400 for remote administration. In brief overview, at step 402, a device may transmit a request for a trigger file to a server. At step 404, the server may determine if the trigger file is available. If not, the server may reply accordingly, and at step 406, the device may reset a local timer. If the trigger file is available, at step 408, the device may retrieve the trigger file. At step 410, the device may determine if the trigger file includes an identifier of the device. If not, the device may reset the local timer at step 406. If the trigger file includes the identifier of the device, then, in some implementations, the device may request a certificate, signature, token, or other authorization credential from the server at step 412. After receiving the credential, at step 414, the device may establish a VPN connection with a management server. The device may configure a link local address at step 416, and establish communications with a management device at step 418.

Still referring to FIG. 4A and in more detail, at step 402, a device or appliance may transmit a request for a trigger file to a server. In implementations in which the server is a web server, the request may be an HTTP GET request or request for a web page. In implementations in which the server is an FTP server, the request may be a request to connect and download a file. The request may be transmitted via any type and form of network, such as the Internet. The server and/or file may be at a predetermined or preconfigured URL or IP address.

At step 404, the server may determine if the trigger file is available. The server may perform any function for determining if the trigger file is available, such as scanning a directory for the file or attempting to retrieve the requested file from memory. If the file is not present, the server may respond appropriately, such as with a 404 "not found" error or similar "file not found" response. Responsive to receiving the error, at step 406, the device may reset a local timer. Upon expiration of the timer, steps 402-406 may be repeated.

If the trigger file is available, at step 408, the device may retrieve the trigger file. Retrieving the file may be via any appropriate method based on the protocol used, such as downloading the file, reading the file, receiving a response comprising the file, etc. The trigger file may be of any type and form as discussed above in connection with FIG. 2, and may include one or more device identifiers in some implementations. In such implementations, at step 410, the device may determine if the trigger file includes an identifier of the device. The device may search the file for an identifier corresponding to the identifier of the device. In some implementations, the identifier may be obfuscated or encrypted with a predetermined key. In one implementation, the identifier may be a predetermined code hashed or encrypted with the device identifier as a seed. The device may decrypt the identifier with its device identifier to determine if the result matches the predetermined code, at which point the device may continue the remote management process.

If the trigger file does not include an identifier of the device, the device may reset the local timer at step 406 and repeat steps 402-410. If the trigger file includes the identifier of the device, then, in some implementations, the device may request a certificate, signature, token, or other authorization credential from the server at step 412. Requesting the certificate or other authorization credential may include transmitting a request including an identifier of the device or a predetermined code. In some implementations, the request may include information from the trigger file, such as a cookie, trigger identifier, or other such information. The device may receive the certificate or other credential in a similar manner to receiving the trigger file, as discussed above.

After receiving the credential or certificate, at step 414, the device may establish a VPN connection with a management server. Establishing the VPN connection may include performing one or more handshaking routines, such as establishing a transport layer connection with the management server or providing authorization credentials or the certificate to the management server. Once authenticated and the VPN is established, the device may configure a link local address at step 416. An IPv6 link-local address is a network address only valid for a specific network segment, such as the VPN connection. The link-local address may include a predetermined prefix (e.g. fe80) and be based off a MAC address of the device. For example, in one implementation, the address may consist of a first half of the MAC address, an interstitial code (e.g. FF:FE), and a second half of the MAC address. In other implementations, different methods may be used to create the address. As the address is based off the MAC address, the management server or management device will not have the same link-local address, and there will not be any address conflicts. At step 418, the management device or management server may establish communications via the IPv6 link-local address and perform management functions, including uploading configuration changes or firmware updates, downloading logs, or performing other functions.

In some implementations, the management device or management server may subsequently terminate the session, once remote configuration or administration is complete. In other implementations, the trigger file may be maintained for as long as the remote administration session is active, and may be removed at the end of the session. In a further implementation, the removal of the trigger file may be used to terminate the remote management session. For example, the remote device 160 may continue requesting the trigger file periodically during the remote management session as at steps 402-410, and may maintain the VPN connection with the management server or device as long as the trigger file is found and/or retrieved. An administrator or the management server or device may remove the trigger file to terminate the session, and upon determining that the trigger file is no longer present or does not include identifiers of the remote device, the remote device may terminate the VPN connection, disable a link local address, or take other similar steps.

Figure 4B:
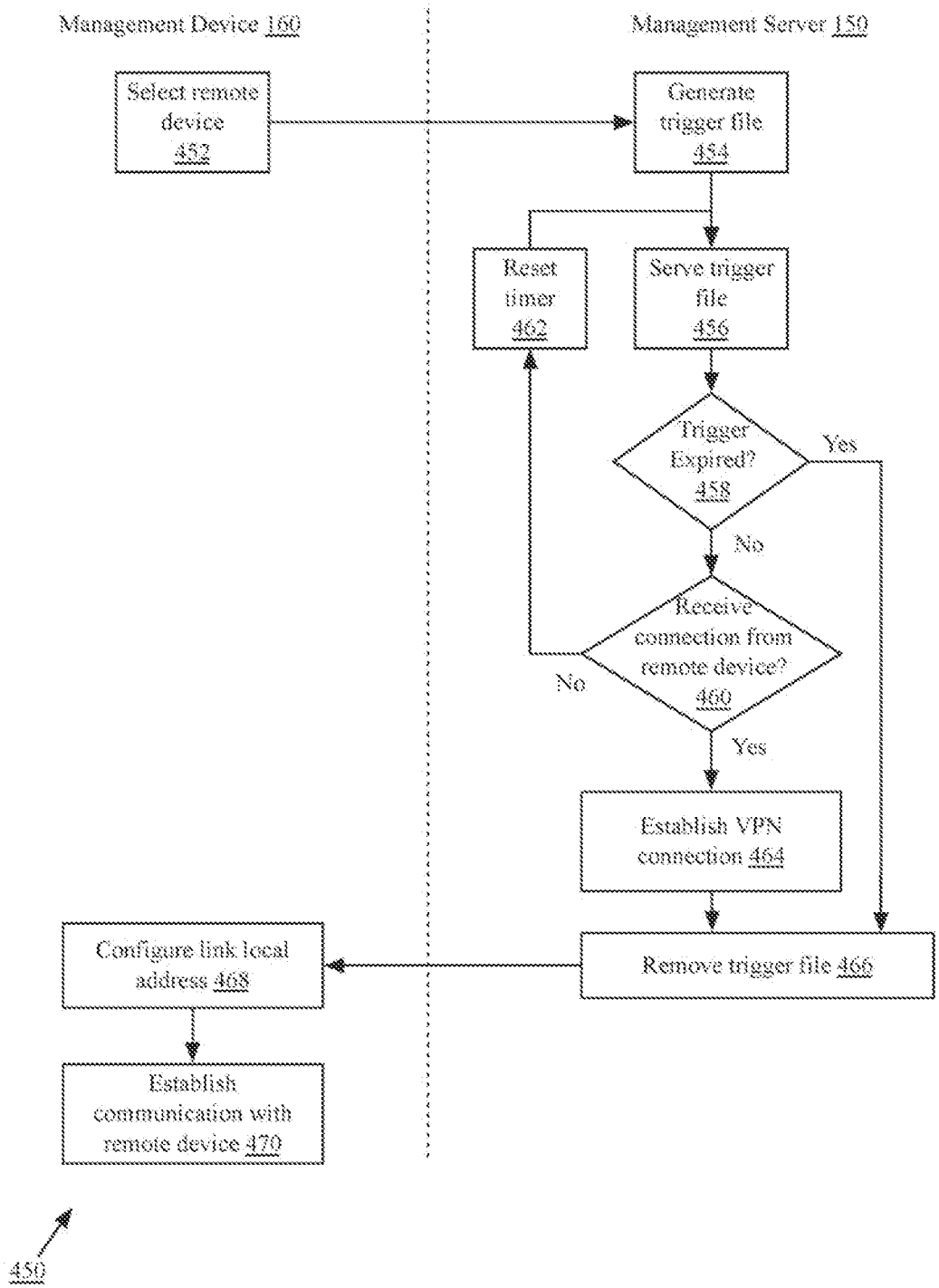

FIG. 4B is another flow chart of an implementation of a method 450 for remote administration, with steps performed by a management device 160 or management server 150. Although shown separately, in some implementations, the management device and management server may be a single computing device.

At step 452, a user or administrator may select a remote device to manage. The device may be selected by serial number, MAC address, device identifier, or any other such method. In some implementations, the management system may provide an interface for selecting the appliance or device, and may retrieve corresponding device identifiers based on the selection. For example, the administrator may identify the device by location (e.g. "Data center, floor 2") and the management device may retrieve the corresponding identifier from a lookup table or database.

Once a device identifier is retrieved or selected, at step 454, a trigger generator may generate a trigger file. As discussed above, the trigger file may be a web page, XML file, data file, or other such data for triggering a remote device to initiate a remote management session, upon retrieval of the trigger file. In some implementations, generating the trigger file may comprise modifying an existing trigger file to add the device identifier of the requested device. At step 456, the trigger file may be uploaded or transferred to a server, such as a web server, as discussed above, and made available to the remote device. As the remote device periodically requests the trigger file, the system may need to wait some amount of time, depending on when the last request was transmitted. In some implementations, the trigger file may have an expiration time or date. At step 458, the management server may determine if the trigger file has expired by comparing a local time to the expiration time. If so, then the trigger file may be removed at step 466, such as by deleting the file from the web server or uploading a null file or trigger file with no device identifier.

If the trigger file has not expired, then at step 460, the management server may determine whether it has received a connection from the remote device. If not, then a wait timer may be reset at step 462, and steps 456-460 may be repeated. If the management server has received a connection from the remote device, then at step 464, the management server may establish a VPN connection with the remote device. As discussed above, establishing the VPN connection may include performing handshaking and/or authentication routines, including verifying a signature or certificate or otherwise authenticating the remote device. The trigger file may be removed at step 466, as discussed above, to prevent repeat requests from the remote device. In other implementations, the trigger file may be maintained for as long as the remote administration session is active (e.g. steps 468, 470), and may be removed at the end of the session. In a further implementation, the removal of the trigger file may be used to terminate the remote management session. For example, the remote device 160 may continue requesting the trigger file periodically during the remote management session, and may maintain the VPN connection with the management server or device as long as the trigger file is found and/or retrieved. An administrator or the management server or device may remove the trigger file to terminate the session, and upon determining that the trigger file is no longer present or does not include identifiers of the remote device, the remote device may terminate the VPN connection, disable a link local address, or take other similar steps.

At step 468, the management device may configure an IPv6 link-local address on its network interface and may execute a neighbor discovery routine to identify the link-local address of the remote device. Once addresses are exchanged, at step 470, the administrator may perform management functions on the device, as discussed above.

Accordingly, the systems and methods discussed herein provide a triggered "call home" functionality allowing remote management of appliances without needing to specifically configure the appliance, and without creating network address conflicts.

Figure 5:
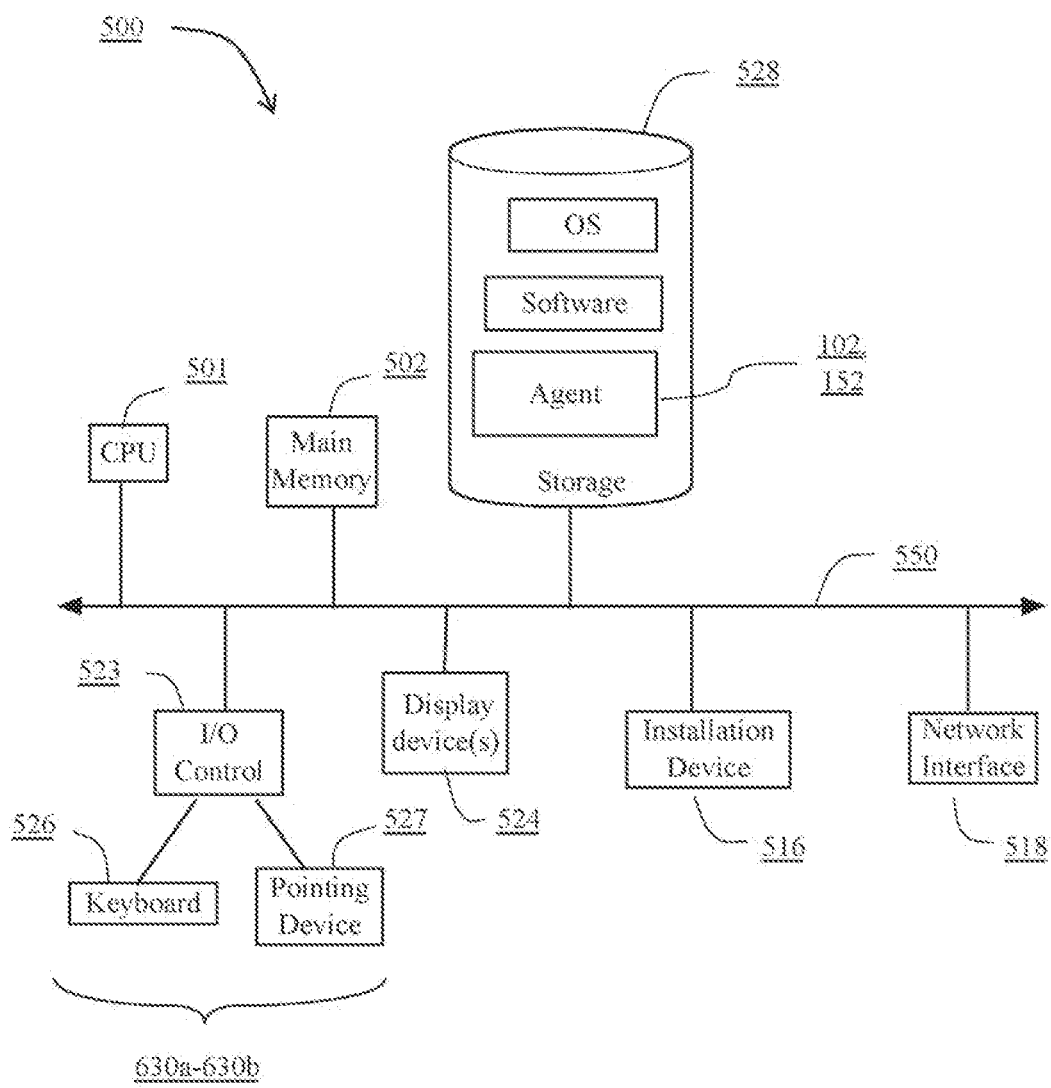
FIG. 5 is a block diagram of an exemplary computing device useful for practicing the methods and systems described herein.

FIG. 5 is a block diagram of an exemplary computing device useful for practicing the methods and systems described herein. The various devices and servers may be deployed as and/or executed on any type and form of computing device, such as a computer, network device or appliance capable of communicating on any type and form of network and performing the operations described herein. The computing device may comprise a laptop computer, desktop computer, virtual machine executed by a physical computer, tablet computer, such as an iPad tablet manufactured by Apple Inc. or Android-based tablet such as those manufactured by Samsung, Inc. or Motorola, Inc., smart phone or PDA such as an iPhone-brand/iOS-based smart phone manufactured by Apple Inc., Android-based smart phone such as a Samsung Galaxy or HTC Droid smart phone, or any other type and form of computing device. FIG. 5 depicts a block diagram of a computing device 500 useful for practicing an embodiment of the appliance 100, server 140, management server 150, or management device 160. A computing device 500 may include a central processing unit 501; a main memory unit 502; a visual display device 524; one or more input/output devices 530a-530b (generally referred to using reference numeral 530), such as a keyboard 526, which may be a virtual keyboard or a physical keyboard, and/or a pointing device 527, such as a mouse, touchpad, or capacitive or resistive single- or multi-touch input device; and a cache memory 540 in communication with the central processing unit 501.

The central processing unit 501 is any logic circuitry that responds to and processes instructions fetched from the main memory unit 502 and/or storage 528. The central processing unit may be provided by a microprocessor unit, such as: those manufactured by Intel Corporation of Santa Clara, Calif.; those manufactured by Motorola Corporation of Schaumburg, Ill.; those manufactured by Apple Inc. of Cupertino Calif., or any other single- or multi-core processor, or any other processor capable of operating as described herein, or a combination of two or more single- or multi-core processors. Main memory unit 502 may be one or more memory chips capable of storing data and allowing any storage location to be directly accessed by the microprocessor 501, such as random access memory (RAM) of any type. In some embodiments, main memory unit 502 may include cache memory or other types of memory.

The computing device 500 may support any suitable installation device 516, such as a floppy disk drive, a CD-ROM drive, a CD-R/RW drive, a DVD-ROM drive, tape drives of various formats, USB/Flash devices, a hard-drive or any other device suitable for installing software and programs such as a management agent or trigger generator, or portion thereof. The computing device 500 may further comprise a storage device 528, such as one or more hard disk drives or redundant arrays of independent disks, for storing an operating system and other related software, and for storing application software programs such as any program related to the management agent.

Furthermore, the computing device 500 may include a network interface 518 to interface to a Local Area Network (LAN), Wide Area Network (WAN) or the Internet through a variety of connections including, but not limited to, standard telephone lines, LAN or WAN links (e.g., Ethernet, T1, T3, 56 kb, X.25), broadband connections (e.g., ISDN, Frame Relay, ATM), wireless connections, (802.11a/b/g/n/ac, BlueTooth), cellular connections, or some combination of any or all of the above. The network interface 518 may comprise a built-in network adapter, network interface card, PCMCIA network card, card bus network adapter, wireless network adapter, USB network adapter, cellular modem or any other device suitable for interfacing the computing device 500 to any type of network capable of communication and performing the operations described herein.

A wide variety of I/O devices 530a-530n may be present in the computing device 500. Input devices include keyboards, mice, trackpads, trackballs, microphones, drawing tablets, and single- or multi-touch screens. Output devices include video displays, speakers, headphones, inkjet printers, laser printers, and dye-sublimation printers. The I/O devices 530 may be controlled by an I/O controller 523 as shown in FIG. 5. The I/O controller may control one or more I/O devices such as a keyboard 526 and a pointing device 527, e.g., a mouse, optical pen, or multi-touch screen. Furthermore, an I/O device may also provide storage 528 and/or an installation medium 516 for the computing device 500. The computing device 500 may provide USB connections to receive handheld USB storage devices such as the USB Flash Drive line of devices manufactured by Twintech Industry, Inc. of Los Alamitos, Calif.

The computing device 500 may comprise or be connected to multiple display devices 524a-524n, which each may be of the same or different type and/or form. As such, any of the I/O devices 530a-530n and/or the I/O controller 523 may comprise any type and/or form of suitable hardware, software embodied on a tangible medium, or combination of hardware and software to support, enable or provide for the connection and use of multiple display devices 524a-524n by the computing device 500. For example, the computing device 500 may include any type and/or form of video adapter, video card, driver, and/or library to interface, communicate, connect or otherwise use the display devices 524a-524n. A video adapter may comprise multiple connectors to interface to multiple display devices 524a-524n. The computing device 500 may include multiple video adapters, with each video adapter connected to one or more of the display devices 524a-524n. Any portion of the operating system of the computing device 500 may be configured for using multiple displays 524a-524n. Additionally, one or more of the display devices 524a-524n may be provided by one or more other computing devices, such as computing devices 500a and 500b connected to the computing device 500, for example, via a network. These embodiments may include any type of software embodied on a tangible medium designed and constructed to use another computer's display device as a second display device 524a for the computing device 500. One ordinarily skilled in the art will recognize and appreciate the various ways and embodiments that a computing device 500 may be configured to have multiple display devices 524a-524n.

A computing device 500 of the sort depicted in FIG. 5 typically operates under the control of an operating system, such as any of the versions of the Microsoft®Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein.

The computing device 500 may have different processors, operating systems, and input devices consistent with the device. For example, in one embodiment, the computer 500 is an Apple iPhone or Motorola Droid smart phone, or an Apple iPad or Samsung Galaxy Tab tablet computer, incorporating multi-input touch screens. Moreover, the computing device 500 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software embodied on a tangible medium, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

The invention claimed is:

1. A method of device management, comprising:
at a management device, selecting a client device to manage comprising selecting a unique identifier for the client device;
generating a management file to manage the client device, the management file having an expiration time controlled by a timer;
forwarding the management file to a server;
at a management server, determining whether the expiration time has lapsed by comparing the current time to the expiration time and if the expiration time has passed,
performing at the server one of: deleting the management file, replacing the management file with a null file, or removing the client device identifier from the management file; and
if the expiration time has not passed, determining whether the management server has received a connection request from the client device; and
  if the management server has not received a connection request from the client device, resetting, by the timer, the expiration time;
  if the management server has received a connection request from the client device,
    establishing a network connection between the client device and the management device, wherein the management server receives a login request from the client device and, based on the login request, establishes the network connection;
    receiving, by the management device over the network connection, a request from the client device for management instructions from the management device, the management device sending the management instructions to the client device;
    executing the management instructions on the client device; and
    resetting, by the timer, the expiration time of the management file.

2. The method of claim 1, unique identifier comprises a serial number, a MAC address, or a unique key value.

3. The method of claim 1, wherein selecting a client to manage further comprises: receiving an input of a device location and, based on the device location, retrieving the unique identifier.

4. The method of claim 1, wherein the management file is represented in a format comprising a web page, or an XML file.

5. The method of claim 4, wherein format comprises a web page, the client device comprises a web browser, and the management server comprises a web server, and requesting the management instructions from the management device comprises issuing a Hypertext Transfer Protocol (HTTP) Get request.

6. The method of claim 1, wherein generating a management file comprises modifying an existing management file to include the client device identifier.

7. The method of claim 1, wherein upon establishing a network connection between the client device and the management device, configuring local-link addresses as a basis for sending and receiving information between the management device and the client device including sending the management instructions from the management device to the client device.

8. The method of claim 7, wherein the management instructions comprise: retrieving log files from the client device, downloading firmware or drive updates to the client device, or providing configuration options to the client device.

9. A device management system comprising:
at least one processor; and
memory encoding computer executable instructions that, when executed by the at least one processor, perform a method comprising:
at a management device, selecting a client device to manage comprising selecting a unique identifier for the client device;
generating a management file to manage the client device, the management file having an expiration time controlled by a timer;
forwarding the management file to a server;
at a management server, determining whether the expiration time has lapsed by comparing the current time to the expiration time and if the expiration time has passed,
performing at the server one of: deleting the management file, replacing the management file with a null file, or removing the client device identifier from the management file; and
if the expiration time has not passed, determining whether the management server has received a connection request from the client device; and
  if the management server has not received a connection request from the client device,
    resetting, by the timer, the expiration time;
  if the management server has received a connection request from the client device,
    establishing a network connection between the client device and the management device, wherein the management server receives a login request from the client device and, based on the login request, establishes the network connection;
    receiving, by the management device over the network connection, a request from the client device for management instructions from the management device, the management device sending the management instructions to the client device;
    executing the management instructions on the client device; and
    resetting, by the timer, the expiration time of the management file.

10. The system of claim 9, unique identifier comprises a serial number, a MAC address, or a unique key value.

11. The system of claim 9, wherein selecting a client to manage further comprises: receiving an input of a device location and, based on the device location, retrieving the unique identifier.

12. The system of claim 9, wherein the management file is represented in a format comprising a web page, or an XML file.

13. The system of claim 12, wherein format comprises a web page, the client device comprises a web browser, and the management server comprises a web server, and requesting the management instructions from the management device comprises issuing a Hypertext Transfer Protocol (HTTP) Get request.

14. The system of claim 9, wherein generating a management file comprises modifying an existing management file to include the client device identifier.

15. The system of claim 9, wherein upon establishing a network connection between the client device and the management device, configuring local-link addresses as a basis for sending and receiving information between the management device and the client device including sending the management instructions from the management device to the client device.

16. The system of claim 15, wherein the management instructions comprise: retrieving log files from the client device, downloading firmware or drive updates to the client device, or providing configuration options to the client device.

* * * * *